United States Patent
Yang et al.

(10) Patent No.: US 11,212,851 B2
(45) Date of Patent: Dec. 28, 2021

(54) METHOD AND DEVICE FOR WIRELESS COMMUNICATION

(71) Applicant: Guangdong OPPO Mobile Telecommunications Corp., Ltd., Guangdong (CN)

(72) Inventors: Ning Yang, Dongguan (CN); Jianhua Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 5 days.

(21) Appl. No.: 16/752,364

(22) Filed: Jan. 24, 2020

(65) Prior Publication Data

US 2020/0163133 A1    May 21, 2020

Related U.S. Application Data

(63) Continuation of application No. PCT/CN2017/100395, filed on Sep. 4, 2017.

(51) Int. Cl.
*H04W 76/11* (2018.01)
*H04W 76/19* (2018.01)
(Continued)

(52) U.S. Cl.
CPC ............ *H04W 76/11* (2018.02); *H04W 28/06* (2013.01); *H04W 76/19* (2018.02); *H04W 76/27* (2018.02)

(58) Field of Classification Search
CPC ............ H04W 28/06; H04W 36/0033; H04W 36/0055; H04W 36/06; H04W 76/11; H04W 76/19; H04W 76/27
See application file for complete search history.

(56) References Cited

U.S. PATENT DOCUMENTS

| 8,611,303 B2 | 12/2013 | Rezaiifar et al. |
| 9,380,469 B2 | 6/2016 | Zou et al. |

(Continued)

FOREIGN PATENT DOCUMENTS

| CN | 101471874 A | 7/2009 |
| CN | 101755428 A | 6/2010 |

(Continued)

OTHER PUBLICATIONS

Ericsson; "Corrections to C-IoT optimisations in Stage-2", 3GPP TSG-RAN WG2 Meeting #95, R2-165473, Gothenburg, Sweden, Aug. 22-26, 2016.

(Continued)

*Primary Examiner* — Jean A Gelin
(74) *Attorney, Agent, or Firm* — Perkins Coie LLP

(57) ABSTRACT

Embodiments of this application disclose a method and a device for wireless communication. The method includes: obtaining access stratum context identifier information of a first terminal device, where the access stratum context identifier information of the first terminal device is used to identify access stratum context information of the first terminal device that is related to the first terminal device on a first access network device; and determining the first access network device according to the access stratum context identifier information of the first terminal device, so that a second access network device providing a network service to the first terminal device obtains the access stratum context information of the first terminal device from the first access network device. The method and the device in the embodiments of this application help reduce network overheads.

17 Claims, 4 Drawing Sheets

(51) Int. Cl.
  *H04W 76/27* (2018.01)
  *H04W 28/06* (2009.01)

(56) References Cited

U.S. PATENT DOCUMENTS

| | | | |
|---|---|---|---|
| 9,585,028 B2 | 2/2017 | Zou et al. | |
| 9,813,946 B2 | 11/2017 | Zhang | |
| 10,979,269 B2* | 4/2021 | Baldemair | H04B 1/7083 |
| 2003/0157937 A1* | 8/2003 | Oikarinen | H04W 68/00 455/445 |
| 2008/0186920 A1 | 8/2008 | Rezaiifar et al. | |
| 2008/0311923 A1* | 12/2008 | Petrovic | H04W 76/12 455/450 |
| 2011/0128945 A1 | 6/2011 | Lin | |
| 2013/0295855 A1 | 11/2013 | Zou et al. | |
| 2014/0198767 A1* | 7/2014 | Heo | H04W 72/00 370/331 |
| 2015/0237532 A1 | 8/2015 | Zhang | |
| 2016/0205572 A1 | 7/2016 | Zou et al. | |
| 2017/0171752 A1* | 6/2017 | Lee | H04W 76/10 |
| 2017/0202051 A1* | 7/2017 | Hwang | H04W 76/19 |
| 2018/0227235 A1* | 8/2018 | Lu | H04W 28/0268 |
| 2018/0270716 A1 | 9/2018 | Takahashi et al. | |
| 2019/0021120 A1* | 1/2019 | Chen | H04W 76/27 |
| 2019/0082490 A1* | 3/2019 | Zhang | H04W 48/08 |
| 2019/0132783 A1* | 5/2019 | Deng | H04W 36/0077 |
| 2019/0230569 A1* | 7/2019 | Kim | H04W 88/08 |
| 2019/0253888 A1* | 8/2019 | Jerichow | H04W 12/04 |
| 2019/0254108 A1* | 8/2019 | Iwai | H04W 76/27 |
| 2019/0261233 A1* | 8/2019 | Duan | H04W 36/0072 |
| 2019/0349406 A1* | 11/2019 | Pan | H04W 8/20 |
| 2019/0373534 A1* | 12/2019 | Wang | H04W 76/12 |
| 2020/0196232 A1* | 6/2020 | Drevo | H04W 76/27 |

FOREIGN PATENT DOCUMENTS

| | | |
|---|---|---|
| CN | 102577176 A | 7/2012 |
| CN | 102595466 A | 7/2012 |
| CN | 103220736 A | 7/2013 |
| CN | 103796262 A | 5/2014 |
| EP | 3373692 A1 | 9/2018 |
| JP | 6123009 B1 | 4/2017 |
| WO | 2017048170 A1 | 3/2017 |
| WO | 2017085621 A1 | 5/2017 |

OTHER PUBLICATIONS

Written Opinion of the International Search Authority in the international application No. PCT/CN2017/100395, dated May 24, 2018.
First Office Action of the European application No. 17923408.3, dated Nov. 6, 2020.
International Patent Application No. PCT/CN2017/100395 , "International Search Report", dated May 24, 2018, 6 pages.
Ericsson, Tdoc R2-1707846 "UE Context ID discussion" Aug. 25, 2017.
European patent application No. 17923408.3, Extended European Search Report, dated Jul. 8, 2020.
R2-1704116 Ericsson Inactive to Connected state transition issued on May 19, 2017, 12 pages.
ZTE, R3-161377 "Response to R3-161252", issued on May 27, 2016, 3 pages.
Samsung, R3-161252 "Discussion on trancated Resume ID", issued on May 27, 2016, 4 pages.
ZTE, R2-164320 "Open issues for cIoT optimization", May 27, 2016, 5 pages.
First Office Action of the Chile application No. 202000523, dated May 20, 2021.
First Office Action of the Chinese application No. 202010086745.X, dated Apr. 28, 2021.
Second Office Action of the Chinese application No. 202010086745.X, dated Jul. 2, 2021.
Oral Office Action of the European application No. 17923408.3, dated May 10, 2021.
First Office Action of the Japanese application No. 2020-512870, dated Jun. 1, 2021.
First Office Action of the Korean application No. 10-2020-7007939, dated Jul. 19, 2021.
CATT,"Considerations on Resume ID"[online], 3GPP TSG-RAN WG3#91bis R3-160608, Internet <URL:http://www.3gpp.org/ftp/tsg_ran/WG3_lu/TSGR3_91bis/Docs/R3-160608.zip>, 2016, 04 months, 01 days.
Ericsson, "Common and specific building blocks for light connected Ues", 3GPP TSG RAN WG2, meeting #95bis, R2-166953, Oct. 1, 2016.
Notice of Rejection of the Chinese application No. 202010086745.X, dated Sep. 18, 2021. 15 pages with English translation.
Second Office Action of the Japanese application No. 2020-512870, dated Sep. 7, 2021. 11 pages with English translation.
Second Office Action of the Chilean application No. 202000523, dated Sep. 21, 2021. 18 pages with English translation.
First Office Action of the Indonesian application No. P00202002549, dated Sep. 3, 2021. 10 pages with English translation.
First Office Action of the Indian application No. 202017013231, dated Nov. 5, 2021. 7 pages with English translation.

* cited by examiner

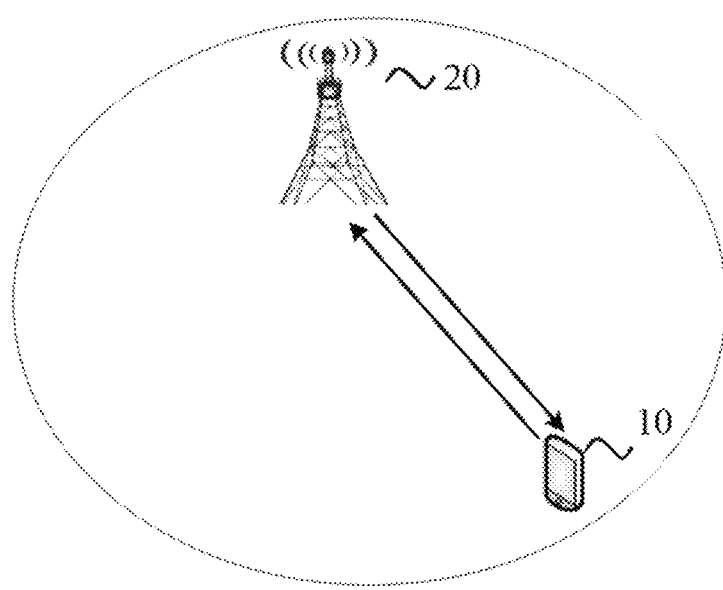

Obtain access stratum context identifier information of a first terminal device, where the access stratum context identifier information of the first terminal device is used to identify access stratum context information of the first terminal device that is related to the first terminal device on a first access network device ~ 110

Determine the first access network device according to the access stratum context identifier information of the first terminal device, so that a second access network device providing a network service to the first terminal device obtains the access stratum context information of the first terminal device from the first access network device ~ 120

FIG. 2

METHOD AND DEVICE FOR WIRELESS COMMUNICATION

CROSS-REFERENCES TO RELATED APPLICATIONS

This application is a continuation of and claims priority to International Patent Application PCT/CN2017/100395, filed on Sep. 4, 2017, the contents of which are hereby incorporated by reference in their entirety.

BACKGROUND OF THE INVENTION

Embodiments of this application relate to the communications field, and more specifically, to a method and a device for wireless communication.

In a 5th generation (5G) communications system, when a terminal has no service within a period of time, to save air interface resources and save power of the terminal, the terminal may be switched to an idle state or an inactive state. When a terminal device moves from one cell to another cell, access stratum context information of the terminal needs to be reconfigured by an access network device in a current cell, causing relatively high network overheads.

SUMMARY OF THE INVENTION

In view of this, embodiments of this application provide a method and a device for wireless communication, to help reduce network overheads.

According to a first aspect, a method for wireless communication is provided. The method includes: obtaining access stratum context identifier information of a first terminal device, where the access stratum context identifier information of the first terminal device is used to identify access stratum context information of the first terminal device that is related to the first terminal device on a first access network device; and determining the first access network device according to the access stratum context identifier information of the first terminal device, so that a second access network device providing a network service to the first terminal device obtains the access stratum context information of the first terminal device from the first access network device.

In a possible implementation, a number or a bit stream that is in the access stratum context identifier information of the first terminal device and that is used to identify information about the first access network device is different from a number or a bit stream of an identifier of the first access network device.

A format of a UE AS Context ID of a terminal device is changed, so that the UE AS Context ID does not directly include an identifier of an access network device; and through an implicit indication of the terminal device, a network device can obtain the identifier of the access network device, to obtain access stratum context information of the terminal device from an access stratum device storing the access stratum context information of the terminal device, thereby protecting a network and security privacy of a user on an air interface.

In a possible implementation, the determining the first access network device according to the access stratum context identifier information of the first terminal device includes: determining the first access network device according to the access stratum context identifier information of the first terminal device and a first mapping relationship, where the first mapping relationship is a mapping relationship between access stratum context identifier information of at least one terminal device and an identifier of at least one access network device, and the at least one terminal device includes the first terminal device.

In a possible implementation, the first mapping relationship is a one-to-one mapping relationship between at least one piece of access stratum context identifier information and the identifier of the at least one access network device, and the at least one piece of access stratum context identifier information includes the access stratum context identifier information of the first terminal device.

In a possible implementation, the first mapping relationship is a one-to-one mapping relationship between at least one piece of number segment information and the identifier of the at least one access network device, and the at least one piece of number segment information includes number segment information of the access stratum context identifier information of the first terminal device.

In a possible implementation, the first mapping relationship is preconfigured in the at least one access network device, and the at least one access network device includes the second access network device.

In a possible implementation, the first mapping relationship is preconfigured in a network node dedicated for parsing the access stratum context identifier information to obtain an identifier of an access network device.

In a possible implementation, the determining the first access network device according to the access stratum context identifier information of the first terminal device includes: querying for the first mapping relationship according to the access stratum context identifier information of the first terminal device that is obtained from the second access network device, and obtaining the identifier of the first access network device.

In a possible implementation, the access stratum context identifier information of the first terminal device is pre-allocated by the first access network device to the first terminal device.

In a possible implementation, the obtaining access stratum context identifier information of a first terminal device includes: when the first terminal device is in a radio resource control RRC inactive state and there is data needing to be transmitted, obtaining the access stratum context identifier information of the first terminal device.

According to a second aspect, a method for wireless communication is provided. The method includes: obtaining access stratum context identifier information of the first terminal device, where the access stratum context identifier information is used to identify access stratum context information of the first terminal device that is related to the first terminal device on a first access network device; and sending the access stratum context identifier information to a second access network device providing a network service to the first terminal device, so that the second access network device obtains the access stratum context information from the first access network device corresponding to the access stratum context identifier information.

In a possible implementation, a number or a bit stream that is in the access stratum context identifier information of the first terminal device and that is used to identify information about the first access network device is different from a number or a bit stream of an identifier of the first access network device.

In a possible implementation, there is a mapping relationship between the access stratum context identifier information and the identifier of the first access network device.

In a possible implementation, there is a mapping relationship between number segment information of the access stratum context identifier and the identifier of the first access network device.

In a possible implementation, the access stratum context identifier information of the first terminal device is pre-allocated by the first access network device to the first terminal device.

In a possible implementation, the sending the access stratum context identifier information to a second access network device providing a network service to the first terminal device includes:

In a possible implementation, the sending the access stratum context identifier information to a second access network device providing a network service to the first terminal device includes: sending an RRC resume request message to the second access network device, where the RRC resume request message carries the access stratum context identifier information.

According to a third aspect, a device for wireless communication is provided. The device is configured to perform the method according to any one of the first aspect or the possible implementations of the first aspect. Specifically, the device includes units configured to perform the method according to any one of the first aspect or the possible implementations of the first aspect.

According to a fourth aspect, a device for wireless communication is provided. The device is configured to perform the method according to any one of the second aspect or the possible implementations of the second aspect. Specifically, the device includes units configured to perform the method according to any one of the second aspect or the possible implementations of the second aspect.

According to a fifth aspect, a device is provided. The device includes a memory, a processor, an input interface, and an output interface. The memory, the processor, the input interface, and the output interface are connected to each other by using a bus system. The memory is configured to store an instruction. The processor is configured to execute the instruction stored in the memory, to perform the method according to any one of the first aspect or the possible implementations of the first aspect.

According to a sixth aspect, a device is provided. The device includes a memory, a processor, an input interface, and an output interface. The memory, the processor, the input interface, and the output interface are connected to each other by using a bus system. The memory is configured to store an instruction. The processor is configured to execute the instruction stored in the memory, to perform the method according to any one of the second aspect or the possible implementations of the second aspect.

According to a seventh aspect, a computer storage medium is provided. The computer storage medium is configured to store a computer software instruction for performing the method according to any one of the first aspect or the possible implementations of the first aspect, the method according to any one of the second aspect or the possible implementations of the second aspect, or the method according to any one of the third aspect or the possible implementations of the third aspect, and includes a program designed for performing the foregoing aspects.

According to an eighth aspect, a computer program product including an instruction is provided. When the instruction is run on a computer, the computer performs the method according to any one of the first aspect or the optional implementations of the first aspect, the method according to any one of the second aspect or the optional implementations of second aspect, or the method according to any one of the third aspect or the optional implementations of the third aspect.

According to an embodiment of the present invention, a device for wireless communication is provided. The device is a first terminal device and the device comprises an obtaining unit, configured to obtain access stratum context identifier information of the first terminal device, wherein the access stratum context identifier information is used to identify access stratum context information of the first terminal device that is related to the first terminal device on a first access network device. The device also includes a sending unit, configured to send the access stratum context identifier information to a second access network device providing a network service to the first terminal device, so that the second access network device obtains the access stratum context information from the first access network device corresponding to the access stratum context identifier information.

A number or a bit stream that is in the access stratum context identifier information of the first terminal device and that is used to identify information about the first access network device can be different from a number or a bit stream of an identifier of the first access network device. There may be a mapping relationship between the access stratum context identifier information and the identifier of the first access network device. There may be a mapping relationship between number segment information of the access stratum context identifier and the identifier of the first access network device. The access stratum context identifier information of the first terminal device may be pre-allocated by the first access network device to the first terminal device. The sending unit may be specifically configured to, when the first terminal device is in a radio resource control RRC inactive state and there is data needing to be transmitted, send the access stratum context identifier information to the second access network device. Moreover, the sending unit may be specifically configured to send an RRC resume request message to the second access network device, wherein the RRC resume request message carries the access stratum context identifier information.

According to an embodiment of the present invention, a device for wireless communication is provided. The device includes an obtaining unit configured to obtain access stratum context identifier information of a first terminal device, wherein the access stratum context identifier information of the first terminal device is used to identify access stratum context information of the first terminal device that is related to the first terminal device on a first access network device. The device also includes a determining unit configured to determining the first access network device according to the access stratum context identifier information of the first terminal device, so that a second access network device providing a network service to the first terminal device obtains the access stratum context information of the first terminal device from the first access network device. The determining unit can be specifically configured to determine the first access network device according to the access stratum context identifier information of the first terminal device and a first mapping relationship, wherein the first mapping relationship is a mapping relationship between access stratum context identifier information of at least one terminal device and an identifier of at least one access network device, and the at least one terminal device comprises the first terminal device. The first mapping relationship can be a one-to-one mapping relationship between at least one piece of number segment information and the identifier of the at least one access network device, and the at least one piece of number segment information comprises number segment information of the access stratum context identifier information of the first terminal device.

The device can be the second access network device and the first mapping relationship can be preconfigured in the at least one access network device, and the at least one access network device comprises the second access network device. In another embodiment, the device is a network node dedicated for parsing the access stratum context identifier information to obtain an identifier of an access network device, and the first mapping relationship is preconfigured in the network node. Moreover, the determining unit can be specifically configured to query for the first mapping relationship and obtain the identifier of the first access network device according to the access stratum context identifier information of the first terminal device that is obtained from the second access network device.

In an embodiment, the access stratum context identifier information of the first terminal device is pre-allocated by the first access network device to the first terminal device. The obtaining unit can be specifically configured to, when the first terminal device is in a radio resource control RRC inactive state and there is data needing to be transmitted, obtain the access stratum context identifier information of the first terminal device.

According to another embodiment of the present invention, a device for wireless communication is provided. The device is a first terminal device and the device comprises an obtaining unit, configured to obtain access stratum context identifier information of the first terminal device, wherein the access stratum context identifier information is used to identify access stratum context information of the first terminal device that is related to the first terminal device on a first access network device. The device also includes a sending unit, configured to send the access stratum context identifier information to a second access network device providing a network service to the first terminal device, so that the second access network device obtains the access stratum context information from the first access network device corresponding to the access stratum context identifier information.

A number or a bit stream that is in the access stratum context identifier information of the first terminal device and that is used to identify information about the first access network device can be different from a number or a bit stream of an identifier of the first access network device. There may be a mapping relationship between the access stratum context identifier information and the identifier of the first access network device. There may be a mapping relationship between umber segment information of the access stratum context identifier and the identifier of the first access network device. The access stratum context identifier information of the first terminal device can be pre-allocated by the first access network device to the first terminal device. The sending unit can be specifically configured to, when the first terminal device is in a radio resource control RRC inactive state and there is data needing to be transmitted, send the access stratum context identifier information to the second access network device. The sending unit can be specifically configured to send an RRC resume request message to the second access network device, wherein the RRC resume request message carries the access stratum context identifier information.

These or other aspects of this application are more concise and understandable in the descriptions of the following embodiments.

BRIEF DESCRIPTION OF THE DRAWINGS

FIG. 1 is a schematic diagram of an application scenario according to an embodiment of this application;

FIG. 2 is a schematic block diagram of a method for wireless communication according to an embodiment of this application;

DETAILED DESCRIPTION OF THE INVENTION

Figure 3:
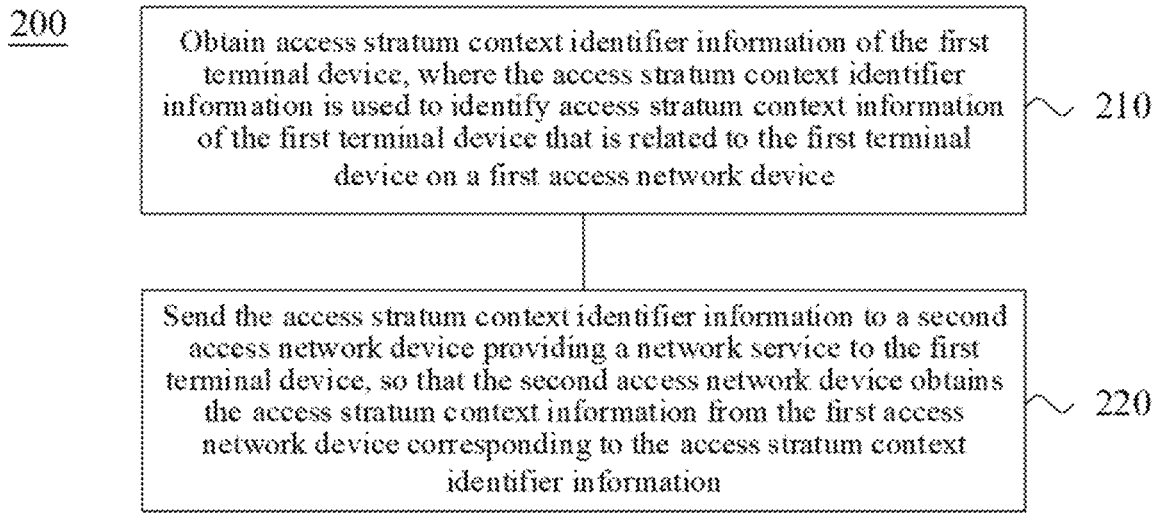
FIG. 3 is another schematic block diagram of a method for wireless communication according to an embodiment of this application.

The technical solutions in the embodiments of this application are clearly and completely described below with reference to the accompanying drawings in the embodiments of this application.

It should be understood that, the technical solutions in the embodiments of this application may be applied to various communications systems, such as: a Global System for Mobile Communications (GSM), a Code Division Multiple Access (CDMA) system, a Wideband Code Division Multiple Access (WCDMA) system, a general packet radio service (GPRS), an LTE system, an LTE frequency division duplex (FDD) system, LTE time division duplex (TDD), a Universal Mobile Telecommunications System (UMTS), a Worldwide Interoperability for Microwave Access (WiMAX) communications system, a new radio (NR) or future 5G system.

Particularly, the technical solutions in the embodiments of this application may be applied to various communications systems based on a non-orthogonal multiple access technology, such as a sparse code multiple access (SCMA) system or a low density signature (LDS) system. Certainly, the SCMA system and the LDS system may also be referred to as other names in the communications field. Further, the technical solutions in the embodiments of this application may be applied to a multi-carrier transmission system using the non-orthogonal multiple access technology, for example, orthogonal frequency division multiplexing (OFDM), filter bank multi-carrier (FBMC), generalized frequency division multiplexing (GFDM), and filtered orthogonal frequency division multiplexing (F-OFDM) systems using the non-orthogonal multiple access technology.

A terminal device in the embodiments of this application may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. An access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network (PLMN), or the like. This is not limited in the embodiments of this application.

A network device in the embodiments of this application may be a device communicating with the terminal device. The network device may be a base transceiver station (BTS) in GSM or CDMA, may be a NodeB (NB) in a WCDMA system, may be an evolved NodeB (eNB or eNodeB) in an LTE system, or may be a radio controller in a cloud radio access network (CRAN) scenario. Alternatively, the network device may be a relay station, an access point, an in-vehicle device, a wearable device, a network device in a future 5G network, a network device in a future evolved PLMN network, or the like. This is not limited in the embodiments of this application.

FIG. 1 is a schematic diagram of an application scenario according to an embodiment of this application. A communications system in FIG. 1 may include a terminal device 10 and a network device 20. The network device 20 is configured to provide a communication service to the terminal device 10 and access a core network. The terminal device 10 searches for a synchronization signal, a broadcast signal, or the like sent by the network device 20 to access the network and communicate with the network. An arrow shown in FIG. 1 may indicate uplink/downlink transmission performed by using a cellular link between the terminal device 10 and the network device 20.

FIG. 2 is a schematic block diagram of a method 100 for wireless communication according to an embodiment of this application. As shown in FIG. 2, the method may be performed by a network device, for example, performed by an access network device. The method 100 includes a part or all of the following content.

S110: Obtain access stratum context identifier information of a first terminal device, where the access stratum context identifier information of the first terminal device is used to identify access stratum context information of the first terminal device that is related to the first terminal device on a first access network device.

S120: Determine the first access network device according to the access stratum context identifier information of the first terminal device, so that a second access network device providing a network service to the first terminal device obtains the access stratum context information of the first terminal device from the first access network device.

Specifically, when a terminal device moves from a cell covered by an access network device to a cell covered by another access network device and access stratum context information of the terminal device is stored in the former access network device, if the terminal device initiates a service, the current access network device may obtain access stratum context identifier information of the terminal device from the terminal device or a core network device, and the access stratum context identifier information may also be used to indicate the former access network device, so that the current access network device may parse the access stratum context identifier information of the terminal device, and further, the current access network device may determine, according to the access stratum context identifier information, the access network device storing the access stratum context information, and the current access network device may obtain the access stratum context information from the access network device storing the access stratum context information. Optionally, after the current access network device receives the access stratum context identifier information sent by the terminal device or the core network device, if the current access network device cannot obtain through parsing an identifier of the access network device storing the access stratum context information of the terminal device, the current access network device may forward the access stratum context identifier information to a network node dedicated for parsing an identifier of an access network device, and after obtaining through parsing the identifier, the network node may send the identifier of the access network device to the current access network device, so that the current access network device can obtain the access stratum context information from the access network device obtained through parsing.

Therefore, the method for wireless communication in this embodiment of this application helps reduce network overheads.

Optionally, in this embodiment of this application, the obtaining access stratum context identifier information of a first terminal device includes: when the first terminal device is in a radio resource control (RRC) inactive state and there is data needing to be transmitted, obtaining the access stratum context identifier information of the first terminal device.

In 5G, to reduce air interface signaling, rapidly resume a radio connection, and rapidly resume a data service, a new RRC state, namely, the RRC inactive state is defined. When UE is in an RRC inactive state, a UE-oriented connection between a radio access network (RAN) and a core network (CN) remains unreleased. When downlink data arrives, the RAN initiates a paging message to awake the UE to resume an RRC connection and receive data. When the UE has uplink data to be sent, the UE autonomously performs an RRC connection resume process and send data. When the UE is in the RRC inactive state, both UE and RAN sides store current UE access stratum (AS) context (Context) of the UE. To identify the context, the network side allocates an identifier (ID), namely, a UE AS Context ID or a UE resume (Resume) identifier, to the UE. When the terminal device in the RRC inactive state initiates a service, the access stratum context identifier information, namely, the UE AS Context ID, of the terminal device may be obtained.

Optionally, in this embodiment of this application, a number or a bit stream that is in the access stratum context identifier information of the first terminal device and that is used to identify information about the first access network device is different from a number or a bit stream of an identifier of the first access network device.

Specifically, the UE AS Context ID in this embodiment of this application is different from a UE AS Context ID in the prior art. The UE AS Context ID in the prior art is transmitted by using plaintext in an RRC resume request message, and the UE AS Context ID further includes base station ID information. For example, an existing UE AS Context ID includes 40-bit information, where the first 20 bits are the identifier of the access network device. Consequently, an internal structure of a network is disclosed through the information exposure and user privacy and rights are affected, because the information indicates a context storage node of the UE or the like. Therefore, according to the method for wireless communication in this embodiment of this application, A format of a UE AS Context ID of a terminal device is changed, so that the UE AS Context ID does not directly include an identifier of an access network device; and through an implicit indication of the terminal device, a network device can obtain the identifier of the access network device, to obtain access stratum context information of the terminal device from an access stratum device storing the access stratum context information of the terminal device, thereby protecting a network and security privacy of a user on an air interface.

Optionally, in this embodiment of this application, the determining the first access network device according to the access stratum context identifier information of the first terminal device includes: determining the first access network device according to the access stratum context identifier information of the first terminal device and a first mapping relationship, where the first mapping relationship is a mapping relationship between access stratum context identifier information of at least one terminal device and an identifier of at least one access network device, and the at least one terminal device includes the first terminal device.

It should be understood that, the UE AS Context ID may be different from the UE AS Context ID in the prior art. For example, the UE AS Context ID may be a random bit stream or number and does not directly include the identifier of the access network device storing the UE AS Context, and there is a mapping relationship between the UE AS Context ID and the access network device storing the UE AS Context. The mapping relationship may be stored in a device obtaining the UE AS Context ID. For example, the mapping relationship may be stored in the second access network device, or the mapping relationship may be stored in a network node dedicated for parsing access stratum context identifier information to obtain an identifier of an access network device.

Optionally, the mapping relationship may be a mapping table, the mapping table may include a mapping relationship between UE AS Context IDs of a plurality of terminal devices and identifiers of a plurality of access network devices, and the plurality of terminal devices may include the first terminal device.

Optionally, the mapping table may be a one-to-one mapping relationship between a UE AS Context ID of a terminal device and an identifier of an access network device, or may be a one-to-multiple mapping relationship, for example, UE AS Context IDs of a plurality of terminal devices may correspond to an identifier of one access network device.

Optionally, the mapping relationship may be a correspondence between a UE AS Context ID and other information of an access network device, for example, may be a correspondence between a UE AS Context ID and position information of an access network device. In conclusion, any mapping relationship between a UE AS Context ID and information that can uniquely determine an access network device shall fall within the protection scope of this embodiment of this application.

Optionally, the mapping relationship may be a mapping relationship between number segment information of access stratum context identifiers of a plurality of terminal devices and a plurality of access network devices. It should be understood that, it may be agreed on that UE AS Context IDs allocated by a same access network device belong to a same number segment. For example, an access network device may preconfigure, through operation, administration, and maintenance (OAM), a mapping relationship between a number segment and an identifier of the access network device, and may obtain a mapping relationship between an identifier of another access network device and a number segment. Therefore, after obtaining an access stratum context identifier of a terminal device, a number segment to which the access stratum context identifier information belongs may be first obtained, and then an identifier of a corresponding access stratum device can be obtained through querying according to the mapping relationship between number segment information and an identifier of an access stratum device.

Optionally, in this embodiment of this application, the access stratum context identifier information of the first terminal device is pre-allocated by the first access network device to the first terminal device.

A person skilled in the art understands that, after the terminal device establishes the access stratum context information of the terminal device on the first access network device, the first access network device may instruct the terminal device to enter the RRC inactive state, so that the first access stratum device may allocate one piece of identifier information, namely, the UE AS Context ID in this embodiment of this application, to the access stratum context information of the terminal device.

This embodiment of this application is described below from a perspective of different devices having a function of parsing the access stratum context identifier of the terminal device to obtain the identifier of the access stratum device.

Optionally, a device having the parsing function may be the second access network device.

Specifically, the first terminal device may send the access stratum context identifier information of the first terminal device to the second access network device. The second access network device may determine the first access network device, for example, the identifier of the first access network device, according to the access stratum context identifier information of the first terminal device and the foregoing various mapping relationships. Then the second access network device may send, to the first access network device, a request for obtaining the access stratum context information of the first terminal device, the first access network device may send the access stratum context information of the first terminal device to the second access network device according to the request, and after receiving the access stratum context information of the first terminal device, the second access network device may perform wireless communication with the first terminal device.

Optionally, the device having the parsing function may be a network node dedicatedly responsible for parsing an access stratum context identifier.

Specifically, the first terminal device may send the access stratum context identifier information of the first terminal device to the second access network device. The second access network device may forward the access stratum context identifier information of the first terminal device to the network node. The network node may determine the first access network device, for example, the identifier of the first access network device, according to the access stratum context identifier information of the first terminal device and the foregoing various mapping relationships. The network node may send the determined identifier of the first access network device to the second access network device. Then the second access network device may send, to the first access network device, a request for obtaining the access stratum context information of the first terminal device, the first access network device may send the access stratum context information of the first terminal device to the second access network device according to the request, and after receiving the access stratum context information of the first terminal device, the second access network device may perform wireless communication with the first terminal device.

FIG. 3 is a schematic block diagram of a method 200 for wireless communication according to an embodiment of this application. As shown in FIG. 3, the method may be performed by a terminal device. The method 200 includes a part or all of the following content.

S210: Obtain access stratum context identifier information of the first terminal device, where the access stratum context identifier information is used to identify access stratum context information of the first terminal device that is related to the first terminal device on a first access network device.

S220: Send the access stratum context identifier information to a second access network device providing a network service to the first terminal device, so that the second access network device obtains the access stratum context information of the first terminal device from the first access network device corresponding to the access stratum context identifier information.

Therefore, the method for wireless communication in this embodiment of this application helps reduce network overheads.

Optionally, in this embodiment of this application, a number or a bit stream that is in the access stratum context identifier information of the first terminal device and that is used to identify information about the first access network device is different from a number or a bit stream of an identifier of the first access network device.

A format of a UE AS Context ID of a terminal device is changed, so that the UE AS Context ID does not directly include an identifier of an access network device; and through an implicit indication of the terminal device, a network device can obtain the identifier of the access network device, to obtain access stratum context information of the terminal device from an access stratum device storing the access stratum context information of the terminal device, thereby protecting a network and security privacy of a user on an air interface.

Optionally, in this embodiment of this application, there is a mapping relationship between the access stratum context identifier information and the identifier of the first access network device.

Optionally, in this embodiment of this application, there is a mapping relationship between number segment information of the access stratum context identifier and the identifier of the first access network device.

Optionally, in this embodiment of this application, the access stratum context identifier information of the first terminal device is pre-allocated by the first access network device to the first terminal device.

Optionally, in this embodiment of this application, the sending the access stratum context identifier information to a second access network device providing a network service to the first terminal device includes: when the first terminal device is in a radio resource control RRC inactive state and there is data needing to be transmitted, sending the access stratum context identifier information to the second access network device.

Optionally, in this embodiment of this application, the sending the access stratum context identifier information to a second access network device providing a network service to the first terminal device includes: sending an RRC resume request message to the second access network device, where the RRC resume request message carries the access stratum context identifier information.

The method for wireless communication according to the embodiments of this application is described in detail above. An apparatus for wireless communication according to embodiments of this application is described below with reference to FIG. 4 to FIG. 7. Technical features described in the method embodiments are applicable to the following apparatus embodiments.

Figure 4:
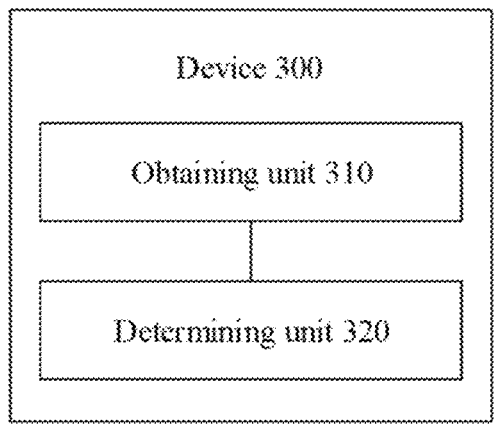
FIG. 4 is a schematic block diagram of a device for wireless communication according to an embodiment of this application.

FIG. 4 is a schematic block diagram of a device 300 for wireless communication according to an embodiment of this application. As shown in FIG. 4, the device 300 includes:

an obtaining unit 310, configured to obtain access stratum context identifier information of a first terminal device, where the access stratum context identifier information of the first terminal device is used to identify access stratum context information of the first terminal device that is related to the first terminal device on a first access network device; and a determining unit 320, configured to determine the first access network device according to the access stratum context identifier information of the first terminal device, so that a second access network device providing a network service to the first terminal device obtains the access stratum context information of the first terminal device from the first access network device.

Therefore, the device for wireless communication in this embodiment of this application helps reduce network overheads.

Optionally, in this embodiment of this application, a number or a bit stream that is in the access stratum context identifier information of the first terminal device and that is used to identify information about the first access network device is different from a number or a bit stream of an identifier of the first access network device.

A format of a UE AS Context ID of a terminal device is changed, so that the UE AS Context ID does not directly include an identifier of an access network device; and through an implicit indication of the terminal device, a network device can obtain the identifier of the access network device, to obtain access stratum context information of the terminal device from an access stratum device storing the access stratum context information of the terminal device, thereby protecting a network and security privacy of a user on an air interface.

Optionally, in this embodiment of this application, the determining unit is specifically configured to: determine the first access network device according to the access stratum context identifier information of the first terminal device and a first mapping relationship, where the first mapping relationship is a mapping relationship between access stratum context identifier information of at least one terminal device and an identifier of at least one access network device, and the at least one terminal device includes the first terminal device.

Optionally, in this embodiment of this application, the first mapping relationship is a one-to-one mapping relationship between access stratum context identifier information of the at least one terminal device and the identifier of the at least one access network device.

Optionally, in this embodiment of this application, the first mapping relationship is a one-to-one mapping relationship between at least one piece of number segment information and the identifier of the at least one access network device, and the at least one piece of number segment information includes number segment information of the access stratum context identifier information of the first terminal device.

Optionally, in this embodiment of this application, the device is the second access network device, the first mapping relationship is preconfigured in the at least one access network device, and the at least one access network device includes the second access network device.

Optionally, in this embodiment of this application, the device is a network node dedicated for parsing the access stratum context identifier information to obtain an identifier of an access network device, and the first mapping relationship is preconfigured in the network node.

Optionally, in this embodiment of this application, the determining unit is specifically configured to: query for the first mapping relationship according to the access stratum context identifier information of the first terminal device that is obtained from the second access network device, and obtain the identifier of the first access network device.

Optionally, in this embodiment of this application, the access stratum context identifier information of the first terminal device is pre-allocated by the first access network device to the first terminal device.

Optionally, in this embodiment of this application, the obtaining unit is specifically configured to: when the first terminal device is in a radio resource control RRC inactive state and there is data needing to be transmitted, obtain the access stratum context identifier information of the first terminal device.

Figure 5:
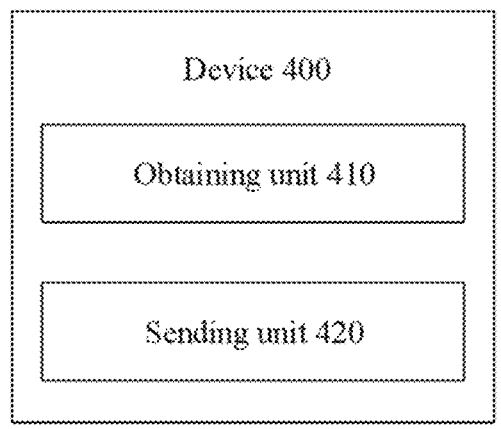
FIG. 5 is another schematic block diagram of a device for wireless communication according to an embodiment of this application.

It should be understood that, the device 300 according to this embodiment of this application may correspond to the executing body in the embodiment of the method 100 in this application, and the foregoing and other operations and/or functions of the units of the device 300 are respectively used to implement the corresponding procedures of the executing body of the method in FIG. 2. For brevity, details are not described herein again. FIG. 5 is a schematic block diagram of a device 400 for wireless communication according to an embodiment of this application. As shown in FIG. 5, the device is a first terminal device, and the device 400 includes:

an obtaining unit 410, configured to obtain access stratum context identifier information of the first terminal device, where the access stratum context identifier information is used to identify access stratum context information of the first terminal device that is related to the first terminal device on a first access network device; and a sending unit 420, configured to send the access stratum context identifier information to a second access network device providing a network service to the first terminal device, so that the second access network device obtains the access stratum context information from the first access network device corresponding to the access stratum context identifier information.

Therefore, the device for wireless communication in this embodiment of this application helps reduce network overheads.

Optionally, in this embodiment of this application, a number or a bit stream that is in the access stratum context identifier information of the first terminal device and that is used to identify information about the first access network device is different from a number or a bit stream of an identifier of the first access network device.

A format of a UE AS Context ID of a terminal device is changed, so that the UE AS Context ID does not directly include an identifier of an access network device; and through an implicit indication of the terminal device, a network device can obtain the identifier of the access network device, to obtain access stratum context information of the terminal device from an access stratum device storing the access stratum context information of the terminal device, thereby protecting a network and security privacy of a user on an air interface.

Optionally, in this embodiment of this application, there is a mapping relationship between the access stratum context identifier information and the identifier of the first access network device.

Optionally, in this embodiment of this application, there is a mapping relationship between number segment information of the access stratum context identifier and the identifier of the first access network device.

Optionally, in this embodiment of this application, the access stratum context identifier information of the first terminal device is pre-allocated by the first access network device to the first terminal device.

Optionally, in this embodiment of this application, the sending unit is specifically configured to: when the first terminal device is in a radio resource control RRC inactive state and there is data needing to be transmitted, send the access stratum context identifier information to the second access network device.

Optionally, in this embodiment of this application, the sending unit is specifically configured to send an RRC resume request message to the second access network device, where the RRC resume request message carries the access stratum context identifier information.

It should be understood that, the device 400 according to this embodiment of this application may correspond to the executing body in the embodiment of the method 200 in this application, and the foregoing and other operations and/or functions of the units of the device 400 are respectively used to implement the corresponding procedures of the executing body of the method in FIG. 3. For brevity, details are not described herein again.

Figure 6:
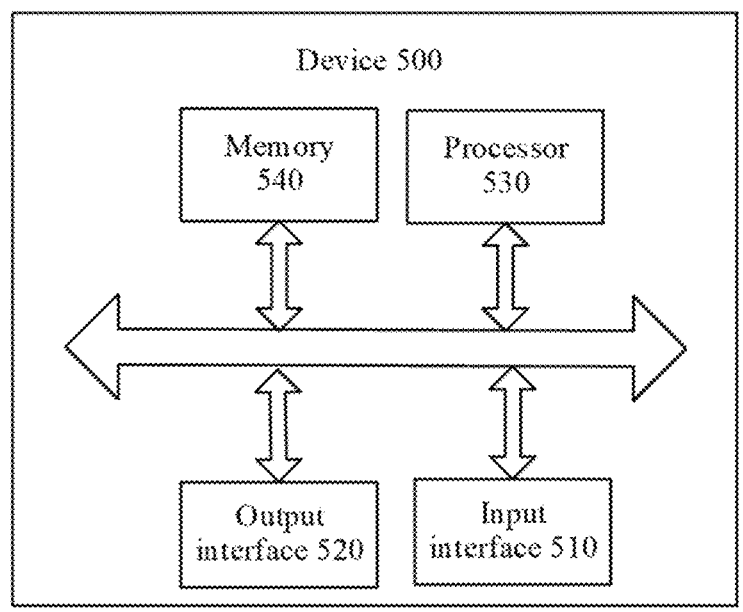
FIG. 6 is still another schematic block diagram of a device for wireless communication according to an embodiment of this application.

As shown in FIG. 6, an embodiment of this application further provides a device 500 for wireless communication. The device 500 may be the device 300 in FIG. 4, and can be configured to perform content of the device corresponding to the method 100 in FIG. 2. The device 500 includes an input interface 510, an output interface 520, a processor 530, and a memory 540. The input interface 510, the output interface 520, the processor 530, and the memory 540 may be connected to each other by using a bus system. The memory 540 is configured to store a program, an instruction, or code. The processor 530 is configured to execute the program, the instruction, or the code in the memory 540, to control the input interface 510 to receive a signal and control the output interface 520 to send a signal and complete operations in the foregoing method embodiments.

Therefore, the device for wireless communication in this embodiment of this application helps reduce network overheads.

It should be understood that, in this embodiment of this application, the processor 530 may be a central processing unit (CPU), and the processor 530 may also be another general purpose processor, a digital signal processor (DSP), an application-specific integrated circuit (ASIC), a field programmable gate array (FPGA) or another programmable logical device, a discrete gate, or a transistor logic device, or a discrete hardware component. The general purpose processor may be a microprocessor or the processor may be any conventional processor, or the like.

The memory 540 may include a read-only memory and a random access memory, and provide an instruction and data to the processor 530. A part of the memory 540 may further include a non-volatile random access memory. For example, the memory 540 may further store device type information.

In an implementation process, content of the foregoing methods may be implemented by using a hardware integrated logical circuit in the processor 530, or by using an instruction in a form of software. Content of the methods disclosed with reference to the embodiments of this application may be directly performed and completed by a hardware processor, or may be performed and completed by using a combination of hardware and software modules in the processor. The software module may be located in a storage medium mature in the art, such as a random access memory, a flash memory, a read-only memory, a programmable read-only memory, an electrically erasable programmable memory, or a register. The storage medium is located in the memory 540, and the processor 530 reads information in the memory 540 and completes content of the foregoing methods in combination with hardware of the processor 530. To avoid repetition, details are not described herein again.

In a specific implementation, the obtaining unit and the determining unit in the device 300 may be implemented by the processor 530 in FIG. 6.

Figure 7:
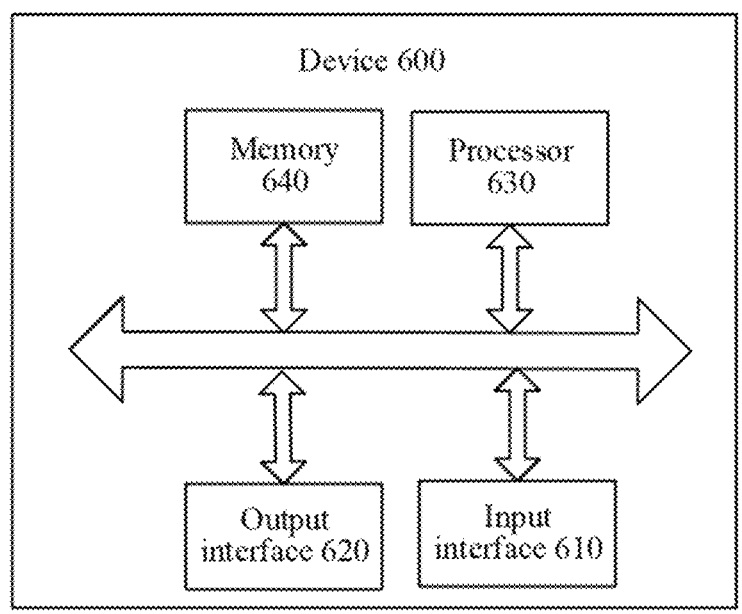
FIG. 7 is still another schematic block diagram of a device for wireless communication according to an embodiment of this application.

As shown in FIG. 7, an embodiment of this application further provides a device 600 for wireless communication. The device 600 may be the device 400 in FIG. 5, and can be configured to perform content of the first terminal device corresponding to the method 200 in FIG. 3. The device 600 includes an input interface 610, an output interface 620, a processor 630, and a memory 640. The input interface 610, the output interface 620, the processor 630, and the memory 640 may be connected to each other by using a bus system. The memory 640 is configured to store a program, an instruction, or code. The processor 630 is configured to execute the program, the instruction, or the code in the memory 640, to control the input interface 610 to receive a signal and control the output interface 620 to send a signal and complete operations in the foregoing method embodiments.

Therefore, the device for wireless communication in this embodiment of this application helps reduce network overheads.

It should be understood that, in this embodiment of this application, the processor 630 may be a central processing unit (CPU), and the processor 630 may also be another general purpose processor, a digital signal processor (DSP), an application-specific integrated circuit (ASIC), a field programmable gate array (FPGA) or another programmable logical device, a discrete gate, or a transistor logic device, or a discrete hardware component. The general purpose processor may be a microprocessor or the processor may be any conventional processor, or the like.

The memory 640 may include a read-only memory and a random access memory, and provide an instruction and data to the processor 630. A part of the memory 640 may further include a non-volatile random access memory. For example, the memory 640 may further store device type information.

In an implementation process, content of the foregoing methods may be implemented by using a hardware integrated logical circuit in the processor 630, or by using an instruction in a form of software. Content of the methods disclosed with reference to the embodiments of this application may be directly performed and completed by a hardware processor, or may be performed and completed by using a combination of hardware and software modules in the processor. The software module may be located in a storage medium mature in the art, such as a random access memory, a flash memory, a read-only memory, a programmable read-only memory, an electrically erasable programmable memory, or a register. The storage medium is located in the memory 640, and the processor 630 reads information in the memory 640 and completes content of the foregoing methods in combination with hardware of the processor 530. To avoid repetition, details are not described herein again.

In a specific implementation, the sending unit in the device 400 may be implemented by the output interface 620 in FIG. 7, and the obtaining unit in the device 400 may be implemented by the processor 630 in FIG. 7.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, the apparatus, and the unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for wireless communication, the method comprising:
   obtaining access stratum context identifier information of a first terminal device, wherein the access stratum context identifier information of the first terminal device is used to identify access stratum context information of the first terminal device that is related to the first terminal device on a first access network device; and
   determining the first access network device according to the access stratum context identifier information of the first terminal device, so that a second access network device providing a network service to the first terminal device obtains the access stratum context information of the first terminal device from the first access network device, wherein determining the first access network device according to the access stratum context identifier information of the first terminal device comprises:
   determining the first access network device according to the access stratum context identifier information of the first terminal device and a first mapping relationship, wherein the first mapping relationship is a mapping relationship between access stratum context identifier information of at least one terminal device and an identifier of at least one access network device, and the at least one terminal device comprises the first terminal device.

2. The method according to claim 1, wherein a number or a bit stream that is in the access stratum context identifier information of the first terminal device and that is used to identify information about the first access network device is different from a number or a bit stream of an identifier of the first access network device.

3. The method according to claim 1, wherein the first mapping relationship is a one-to-one mapping relationship between at least one piece of access stratum context identifier information and the identifier of the at least one access network device, and the at least one piece of access stratum context identifier information comprises the access stratum context identifier information of the first terminal device.

4. The method according to claim 1, wherein the first mapping relationship is a one-to-one mapping relationship between at least one piece of number segment information and the identifier of the at least one access network device, and the at least one piece of number segment information comprises number segment information of the access stratum context identifier information of the first terminal device.

5. The method according to claim 1, wherein the first mapping relationship is preconfigured in the at least one access network device, and the at least one access network device comprises the second access network device.

6. The method according to claim 1, wherein the first mapping relationship is preconfigured in a network node dedicated for parsing the access stratum context identifier information to obtain an identifier of an access network device.

7. The method according to claim 1, wherein the access stratum context identifier information of the first terminal device is pre-allocated by the first access network device to the first terminal device.

8. A device for wireless communication, the device comprising:
   an obtaining unit, configured to obtain access stratum context identifier information of a first terminal device, wherein the access stratum context identifier information is used to identify access stratum context information of the first terminal device that is related to the first terminal device on a first access network device; and
   a sending unit, configured to send the access stratum context identifier information to a second access network device providing a network service to the first terminal device, so that the second access network device obtains the access stratum context information from the first access network device corresponding to the access stratum context identifier information, wherein the first access network device is determined according to the access stratum context identifier information of the first terminal device and a first mapping relationship, wherein the first mapping relationship is a mapping relationship between access stratum context identifier information of at least one terminal device and an identifier of at least one access network device, and the at least one terminal device comprises the first terminal device.

9. The device according to claim 8, wherein a number or a bit stream that is in the access stratum context identifier information of the first terminal device and that is used to identify information about the first access network device is different from a number or a bit stream of an identifier of the first access network device.

10. The device according to claim 8, wherein there is a mapping relationship between number segment information of the access stratum context identifier and an identifier of the first access network device.

11. The device according to claim 8, wherein the access stratum context identifier information of the first terminal device is pre-allocated by the first access network device to the first terminal device.

12. The device according to claim 8, wherein sending the access stratum context identifier information to a second access network device providing a network service to the first terminal device comprises:
   sending an RRC resume request message to the second access network device, wherein the RRC resume request message carries the access stratum context identifier information.

13. A device for wireless communication, wherein the device comprises:
   an obtaining unit, configured to obtain access stratum context identifier information of a first terminal device, wherein the access stratum context identifier information of the first terminal device is used to identify access stratum context information of the first terminal device that is related to the first terminal device on a first access network device; and
   a determining unit, configured to determining the first access network device according to the access stratum context identifier information of the first terminal device, so that a second access network device providing a network service to the first terminal device obtains the access stratum context information of the first terminal device from the first access network device, wherein the determining unit is specifically configured to:

determine the first access network device according to the access stratum context identifier information of the first terminal device and a first mapping relationship, wherein the first mapping relationship is a mapping relationship between access stratum context identifier information of at least one terminal device and an identifier of at least one access network device, and the at least one terminal device comprises the first terminal device.

14. The device according to claim 13, wherein a number or a bit stream that is in the access stratum context identifier information of the first terminal device and that is used to identify information about the first access network device is different from a number or a bit stream of an identifier of the first access network device.

15. The device according to claim 13, wherein the first mapping relationship is a one-to-one mapping relationship between at least one piece of access stratum context identifier information and the identifier of the at least one access network device, and the at least one piece of access stratum context identifier information comprises the access stratum context identifier information of the first terminal device.

16. The device according to claim 13, wherein the device is the second access network device, the first mapping relationship is preconfigured in the at least one access network device, and the at least one access network device comprises the second access network device.

17. The device according to claim 13, wherein the access stratum context identifier information of the first terminal device is pre-allocated by the first access network device to the first terminal device.

* * * * *